United States Patent [19]

Inaba

[11] Patent Number: 4,758,147
[45] Date of Patent: Jul. 19, 1988

[54] AUTOMATIC DIE EXCHANGER FOR INJECTION MOLDING MACHINE

[75] Inventor: Yoshiharu Inaba, Kawasaki, Japan
[73] Assignee: Fanuc Ltd., Minamitsuru, Japan
[21] Appl. No.: 910,211
[22] PCT Filed: Dec. 24, 1985
[86] PCT No.: PCT/JP85/00709
§ 371 Date: Aug. 25, 1986
§ 102(e) Date: Aug. 25, 1986
[87] PCT Pub. No.: WO86/03712
PCT Pub. Date: Jul. 3, 1986

[30] Foreign Application Priority Data

Dec. 25, 1984 [JP] Japan ................................. 59-271870

[51] Int. Cl.⁴ ............................................. B29C 45/06
[52] U.S. Cl. .................................... 425/186; 100/918; 425/190; 425/195; 72/481
[58] Field of Search .............. 414/223, 729, 730, 732, 414/738, 739, 743, 741, 751; 425/185, 190, 192, 193, 183, 186, 195; 100/918; 198/478.1, 468.01, 468.10; 72/481; 29/568

[56] References Cited

U.S. PATENT DOCUMENTS

| Re. 28,437 | 6/1975 | Devol et al. | 901/7 |
| 2,908,405 | 10/1959 | Logan | 100/918 |
| 3,543,910 | 12/1970 | Devol | 901/7 |
| 3,760,956 | 9/1973 | Burch | 901/7 |
| 3,986,448 | 10/1976 | Seyfried et al. | 100/918 |
| 4,359,815 | 11/1982 | Toyoda | 29/568 |
| 4,428,256 | 1/1984 | Ida et al. | 29/568 |
| 4,456,293 | 6/1984 | Panissidi | 414/730 |
| 4,532,692 | 8/1985 | Miyachi | 29/568 |
| 4,545,106 | 10/1985 | Juengel | 901/6 |
| 4,553,313 | 11/1985 | Winter et al. | 29/568 |
| 4,646,421 | 3/1987 | Jaissle et al. | 29/568 |

FOREIGN PATENT DOCUMENTS 58-18899  4/1983  Japan .
59-29788  8/1984  Japan .
59-50485  8/1984  Japan .

Primary Examiner—Willard E. Hoag
Attorney, Agent, or Firm—Staas & Halsey

[57] ABSTRACT

An automatic die exchanger for an injection molding machine is provided, having a rotational table and a travel member capable of approaching and separating from a die mounting section of the injection molding machine. A convey means provided on the travel member is engaged with and disengaged from one of the dies on a plurality of die placing sections of the rotational table. When the travel member is moved, the convey means feeds the die engaged therewith to the die mounting section or removes a die therefrom.

14 Claims, 2 Drawing Sheets

AUTOMATIC DIE EXCHANGER FOR INJECTION MOLDING MACHINE

BACKGROUND OF THE INVENTION

The present invention relates to an automatic die exchanger for an injection molding machine, which can automatically exchange a die of an injection molding machine with a simple structure and a simple operation.

When an injection molding system for plastic molding is systematized for the purpose of automatization and energy savings, the control system of the injection molding machine must be improved and, at the same time, a total system of the injection molding machine and peripheral equipment must be systematized. As one of the methods for this purpose, automatic die exchange is proposed. However, a conventional automatic die exchanger consists of a die stock section using an automated warehouse or the like, a convey unit utilizing an unmanned convey vehicle and an overhead traveling crane, and a control section for controlling the die stock section and the convey unit. In exchanging a die, after the die is removed from an injection molding machine, it is conveyed to the die stock section by the convey unit and is stored therein. Thereafter another die is fetched from the die stock section, is conveyed to the injection molding machine by the convey unit, and is mounted thereon. Since systems of this type tend to be of a large scale and require a high cost, they are not widely used.

SUMMARY OF THE INVENTION

It is an object of the present invention to provide an automatic die exchanger in which the above conventional drawbacks are eliminated and which can automatically exchange a die of an injection molding machine with a simple structure and a simple operation.

In order to achieve the above object, in an automatic die exchanger for an injection molding machine of the present invention, a plurality of die placing sections are provided on a rotational table at angular intervals, a travel member capable of travelling between a die placing section and a die mounting section of the injection molding machine is provided, and a convey means is provided on the travel member. The convey means is engaged with a die, feeds the die from the die placing section to the die mounting section, and conveys the die from the die mounting section to the die placing section.

In this manner, in the automatic die exchanger of the present invention, a die which is selected by rotating the rotational table is brought to oppose the die mounting section of the injection molding machine, the convey means which is integrally movable with the travel member is engaged with the die, and the die is thus fed to or removed from the injection molding machine. Therefore, die exchange can be automatically performed without a need for a large-scale apparatus for die exchange and with a simple operation.

DETAILED DESCRIPTION OF THE PREFERRED EMBODIMENTS

Figure 1:
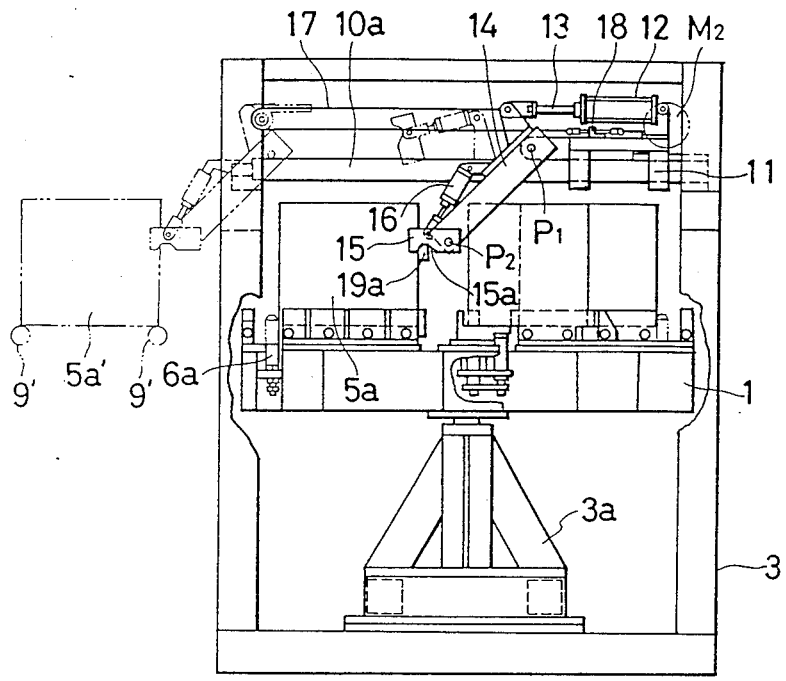
FIG. 1 is a front view of an automatic die exchanger of an injection molding machine according to an embodiment of the present invention.

FIGS. 1 to 4 show an automatic die exchanger of an injection molding machine according to an embodiment of the present invention. The automatic die exchanger is provided behind the injection molding machine (only a die clamping section thereof is shown by $5a'$ as a die mounting section). In the automatic die exchanger, reference numeral 1 denotes a rotational table extending in a horizontal direction; 2, a rotating shaft (refer to FIG. 3) having an upper end fitted in a vertical central hole of the rotational table 1 and supporting the table 1 to be capable of rotating therewith; and 3, a machine frame obtained by assembling a plurality of frames in a substantially cubic manner. The rotating shaft 2 is supported by a support frame 3a fixed on the central portion of the bottom frame of the machine frame 3. A sprocket S1 fixed to the lower end of the shaft 2 is coupled through a chain 4 to a sprocket S2 fixed to the output shaft of a servo motor M1 fixed on the bottom frame of the machine frame 3. Thus, the rotating shaft 2 and the rotational table 1, integrally rotatable therewith are driven by the motor M1.

Figure 2:
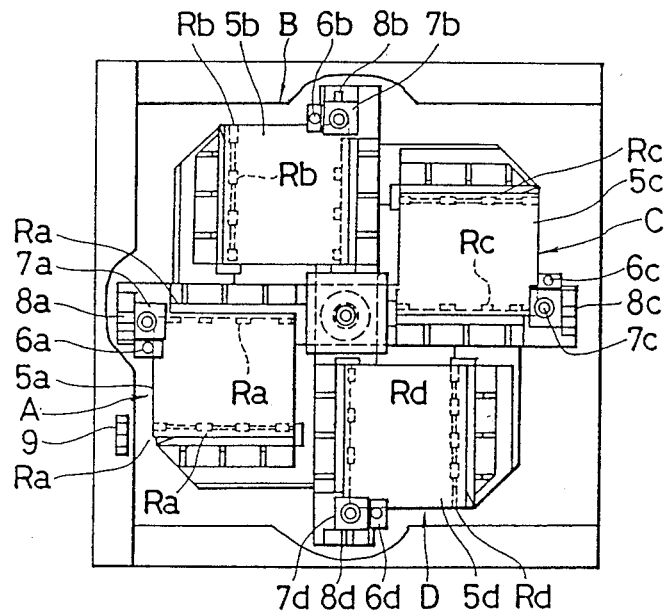
FIG. 2 is a plan view of the die exchanger shown in FIG. 1 from which a die convey section is removed.

Die placing sections A to D for placing four dies $5a$ to $5d$, respectively, are placed on the upper surface of the rotational table 1 at equal angular intervals of about 90°, as shown in FIG. 2. Pairs of roller arrays Ra to Rd are provided on the two side ends of the die placing sections A to D, respectively. The dies $5a$ to $5d$ are slidably placed on the roller arrays Ra to Rd, respectively. Solenoid-type or hydraulic cylinder-type actuators $7a$ to $7d$ (hydraulic cylinder-type actuators in this embodiment) for driving stoppers $6a$ to $6d$, which prevent movement of the dies $5a$ to $5d$, are arranged at outer peripheral edge portions of the rotating table 1 to be adjacent to outer edges of the die placing sections A to D, respectively. The stoppers $6a$ to $6d$ are disposed to project in and withdraw from a convey path for the dies $5a$ to $5d$, which extends between the die placing sections A to D and a die clamping section $5a'$ of the injection molding machine.

Figure 3:
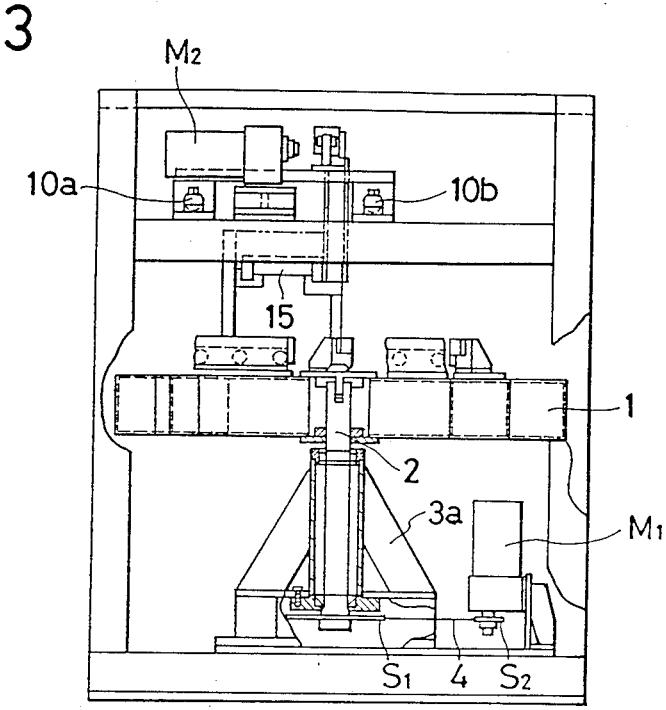
FIG. 3 is a partially sectional right-side view of the die exchanger shown in FIG. 1.
Figure 4:
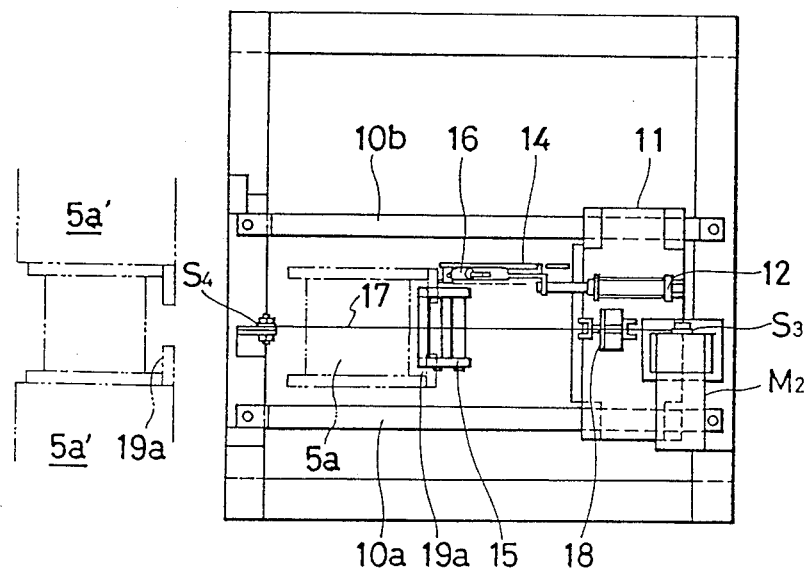
FIG. 4 is a plan view of the die convey section shown in FIG. 1.

Rollers $8a$ to $8d$ are, respectively, provided on one side of the convey path, and a roller 9 operable to cooperate with the rollers $8a$ to $8d$ is provided on the other side of the convey path, so as to guide the dies $5a$ to $5d$ to the die molding section $5a'$ smoothly from the die placing sections A to D. Other rollers (some are indicated by 9') are also provided on the convey path side close to the injection molding machine. More specifically, the roller 9 is arranged on the convey path defining section of the machine frame 3, i.e., on the upper surface of a horizontal outer frame opposing the injection molding machine and matched with the rotational table 1 in height. A pair of guide rods 10a and 10b extend between the vertical outer frames of the machine frame 3 at locations above the rotational table 1 horizontally and parallel to each other, as shown in FIGS. 1, 3, and 4. Two slide sections integrally project from the lower surface of the main portion of the travel member 11 arranged on the guide rods 10a and 10b and are separated from each other. The slide sections are slidably fitted on the rods 10a and 10b, respectively. Thus, the travel member 11 is guided by the guide rods 10a and 10b to move to the right and left in FIGS. 1 and 4. One end of a convey means 14 is pivotally fixed on the travel member 11 side close to the die molding section 5a' by a pin P1. A bracket projecting from the one end of the convey means 14 is fixed on the distal end of a piston rod 13 of a hydraulic cylinder 12 fixed on the travel member 11. When the cylinder 12 is actuated, the convey means 14 is pivoted about the pin P1 in a vertical plane.

The convey means 14 has a die receiving means 15 at its other end. The means 15 is pivotally supported by a pin P2 and is pivoted about the pin P2 by a hydraulic cylinder 16 fixed on the convey means 14. Upon pivot movement of the means 15, an engaging portion 15a of the means 15 is engaged with or disengaged from the corresponding engaging portions (an engaging portion of die 5a is shown as 19a in FIG. 4) provided on the dies 5a to 5d. A servo motor M2 is fixed on one end of one upper horizontal frame of the machine frame 3. A sprocket S3 is fixed on the drive shaft of the servo motor M2 A sprocket S4 is pivotally fixed on the bracket fixed on the other upper horizontal frame of the machine frame 3. A chain 17 extends between the sprockets S3 and S4. The main portion of the travel member 11 is fixed on the chain 17 through a fixing member 18.

The automatic die exchanger of the above arrangement is arranged behind the injection molding machine such that the travel direction of the travel member 11 opposes the die mounting section of the injection molding machine, i.e., the die clamping section 5a'.

The operation of the automatic die exchanger of this embodiment will be described.

First, one of the dies 5a to 5d to be mounted on the injection molding machine is selected. The servo motor M1 is driven to rotate the rotational table 1 until the selected die reaches a portion (the position at which the roller 9 is provided) opposing the die clamping section 5a' of the injection molding machine. The dies 5a to 5d are placed around the rotating shaft 2 on the rotational table 1 at angular intervals of 90°. Therefore, when the rotational table 1 is rotated through 90° to cause one of the dies 5a to 5d to oppose the die clamping section 5a' of the injection molding machine, the dies 5a to 5d are positioned at substantially the same positions. Assume that the die 5a is selected. Then, when the first hydraulic cylinder 12 is actuated to extend the piston rod 13, the convey means 14 is pivoted counterclockwise about the pin P1 to a position indicated by a solid line in FIG. 1. Subsequently, the piston rod of the second hydraulic cylinder 16 is extended to pivot the die receiving means 15 counterclockwise in FIG. 1 about the pin P2, and the engaging portion 15a of the means 15 is engaged with the engaging portion 19a of the die 5a, thus receiving the die 5a, as indicated by a solid line in FIG. 1. The actuator 7a is then actuated to withdraw the stopper 6a from the convey path The servo motor M2 drives the sprockets S3 and S4 and the chain 17, so as to move the travel member 1, which is coupled to the rotating chain 17 through the fixing member 18, to the left in FIGS. 1 and 4 along the guide rods 10a and 10b. As the travel member 11 moves, the convey means 14 movable integrally therewith also moves, and the die receiving means 15 of the means 14 urges against the die 5a. The die 5a moves on the roller array Ra, onto the roller 8a and the roller 9 on the machine frame 3, and then onto the rollers 9' of the machine frame 3 side close to the injection molding machine, so as to be conveyed to a position aligned with the die clamping section 5a' of the injection molding machine indicated by a long and two short dashed line in FIGS. 1 and 4.

Subsequently, the piston rod of the second hydraulic cylinder 16 is retracted to pivot the die receiving means 15 clockwise in FIG. 1 about the pin P2 in order to disengage the die 5a from the die receiving means 15. The servo motor M2 is then driven in the reverse direction to move the travel member 11 and the convey means 14 backward (to the right in FIGS. 1 and 4) to the travel start position. At the same time, the piston rod 13 of the hydraulic cylinder 12 is retracted to pivot the convey means 14 clockwise about the pin P1. The servo motor M2 is then stopped, and the stopper 6a is caused to project at the die lock position by the actuator 7a, thereby restoring the automatic die exchanger to the initial state. The die 5a which is conveyed to the die clamping section 5a' of the injection molding machine in this manner is mounted on the stationary and movable bases constituting the die clamping section 5a' of the injection molding machine, and the die mounting operation is completed.

When the die 5a is removed from the injection molding machine, the empty one of the placing sections A to D (A, in this embodiment) on the rotational table 1 is caused to oppose the injection molding machine. The actuator 7a is actuated to withdraw the stopper 6a again. Then, the servo motor M2 is driven to move the travel member 11 forward to the travel end position (to the left in FIGS. 1 and 4), and is stopped Subsequently, the piston rod 13 of the first hydraulic cylinder 12 is extended, and the piston rod of the second hydraulic cylinder 16 is extended so as to engage the engaging portion 15a of the die receiving means 15 with the engaging portion 19a of the die 5a which is removed from the die clamping section 5a' in advance. Thereafter, the servo motor M2 is driven in the reverse direction to remove the die 5a from the injection molding machine. The die 5a is placed on the rollers 9 and 8a and the roller array Ra and is moved to the right in FIG. 1. When the die 5a is completely placed on the die placing section A on the rotational table 1, the servo motor M2 is stopped. The stopper 6a is caused to project in the convey path to fix the die 5a the piston rod of the second hydraulic cylinder 16 is retracted to disengage the die 5a from the die receiving means 15, the piston rod 13 of the first hydraulic cylinder 12 is retracted to pivot the convey means 14 clockwise in FIG. 1 about the pin P1 to a position not interfering with the dies 5a to 5d, and the removal operation of the die 5a is completed.

The above die exchange operation is repeated as required to selectively mount a desired die in the injection molding machine.

In the above embodiment, four die placing sections A to D are provided on the rotational table 1. However, the rotational table 1 can be increased in size so that it can place more die placing sections thereon. In this case, die placing sections of the same shape are preferably provided at equal angular intervals. In the above embodiment, the servo motors M1 and M2 are used as the drive means for the rotational table 1 and the travel member 11. However, a general-purpose motor can be used instead, and the positions of the rotational table 1 and the travel member 11 can be detected by limit switches to control the motor. Furthermore, the rotational table 1 can be driven manually instead of by a motor. The convey means 14 is pivotally supported by the travel member 11, and the convey means 14 is inserted between the dies and the die is conveyed. However, a plunger of a solenoid-type actuator or a piston rod of a hydraulic cylinder can vertically project from the travel member 11, and the die and the plunger or the piston rod can be manually coupled or separated through an appropriate convey auxiliary member, thereby feeding the die in or out.

I claim:

1. An automatic die exchanger for an injection molding machine with a die mounting section for mounting a die thereon, said automatic die exchanger being disposed in facing relation with said die mounting section, comprising:
   (a) a rotational table having a plurality of die placing sections provided thereon at angular intervals, one of said plurality of die placing sections facing said die mounting section;
   (b) a die convey path between said die mounting section and said one of said plurality of die placing sections;
   (c) a travel member movable toward and away from the die mounting section along said die convey path; and
   (d) convey means provided on said travel member/and arranged, to be engaged with and disengaged from a die mounted on said one of said plurality of die placing sections, for slidably moving the die to feed the die to said die mounting section and to remove the die from said die mounting section.

2. An exchanger according to claim 1, wherein said rotational table is driven to rotate by first motor means which is operatively coupled to a rotating shaft of said rotational table.

3. An exchanger according to claim 1, wherein said plurality of die placing sections is arranged on said rotational table at equal angular intervals.

4. An exchanger according to claim 1, wherein a roller array is arranged on each of said die placing sections.

5. An exchanger according to claim 1, wherein said convey means is pivotally fixed on said travel member.

6. An exchanger according to claim 5, wherein said convey means is pivotally driven by a first actuator fixed on said travel member.

7. An exchanger according to claim 1, wherein the die has an engaging portion, and said convey means has receiving means engageable with and disengageable from the engaging portion of the die.

8. An exchanger according to claim 7, wherein said receiving means has one end pivotally supported on said convey means.

9. An exchanger according to claim 8, wherein said receiving means is pivotally driven by a second actuator fixed on said convey means.

10. An exchanger according to claim 8, wherein a third actuator for driving stopper means is provided on said rotational table to be adjacent to an outer edge of each of said die placing sections, said stopper means being operable to project in and withdraw from a die convey path adjacent to each of said die placing sections.

11. An automatic die exchanger, for an injection molding machine having a die mounting section, comprising: a rotational table having a plurality of die placing sections provided thereon at angular intervals; a travel member movable toward and away from said die mounting sections; and convey means provided on said travel member, and arranged to be engaged with and disengaged from a die on one of said die placing sections, for feeding the die to said die mounting section and for removing the die from said die mounting section;
   wherein said travel member is slidably fitted with a guide rod extending parallel to said rotational table.

12. An exchanger according to claim 11, wherein said travel member is coupled to chain means driven by second motor means to rotate.

13. An automatic die exchanger for an injection molding machine, comprising: a machine frame, a rotational table having a rotating shaft rotatably supported by said machine frame and a plurality of die placing sections provided at angular intervals and extending in a horizontal direction, first drive means for driving said rotating shaft, guide rod means extending in the horizontal direction above said rotational table, a travel member slidably fitted with said guide rod means and movable toward and away from said die mounting sections of said injection molding machine, second drive means for driving said travel means, and convey means having receiving means engageable with and disengageable from a die and being coupled to said travel member to be integrally movable therewith for feeding and removing the die to and from said die mounting section.

14. An exchanger according to claim 13, wherein one end of said convey means is pivotally fixed on said travel member, one end of said receiving means is pivotally supported on the other end of said convey means, said convey means is pivotally driven by a first actuator fixed to said travel member, and said receiving means is pivotally driven by a second actuator fixed to said convey means.

* * * * *

UNITED STATES PATENT AND TRADEMARK OFFICE
CERTIFICATE OF CORRECTION

PATENT NO. : 4,758,147
DATED : Jul. 19, 1988
INVENTOR(S) : INABA

It is certified that error appears in the above-identified patent and that said Letters Patent is hereby corrected as shown below:

Col. 2
Line 49, delete "molding" and insert --clamping--.

Col. 3
Line 1, delete "molding" and insert --clamping--.
Line 19, after "M2" insert --.--.

Col. 4
Line 29, after "stopped" insert --.--.

Col. 6
Line 16, delete "sections" and insert --section--.

Signed and Sealed this

Twenty-seventh Day of December, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,758,147
DATED : Jul. 19, 1988
INVENTOR(S) : INABA

It is certified that error appears in the above-identified patent and that said Letters Patent is hereby corrected as shown below:

Col. 2
Line 49, delete "molding" and insert --clamping--.

Col. 3
Line 1, delete "molding" and insert --clamping--;
Line 19, after "M2" insert --.--.

Col. 4
Line 29, after "stopped" insert --.--.

Col. 5
Lines 24 and 25, "member-/and" should read -- member and --.

Col. 6
Line 16, delete "sections" and insert --section--.

This certificate supersedes Certificate of Correction issued December 27, 1988.

Signed and Sealed this

Twenty-eighth Day of February, 1989

Attest:

DONALD J. QUIGG

*Attesting Officer*   *Commissioner of Patents and Trademarks*